US008744118B2

(12) United States Patent
McQuaide, Jr.

(10) Patent No.: US 8,744,118 B2
(45) Date of Patent: Jun. 3, 2014

(54) METHODS, SYSTEMS, AND PRODUCTS FOR INDEXING SCENES IN DIGITAL MEDIA

(75) Inventor: Arnold Chester McQuaide, Jr., Berkeley Lake, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1151 days.

(21) Appl. No.: 11/890,118

(22) Filed: Aug. 3, 2007

(65) Prior Publication Data
US 2009/0034784 A1    Feb. 5, 2009

(51) Int. Cl.
*G06K 9/00*    (2006.01)

(52) U.S. Cl.
USPC ............. 382/100; 382/305; 382/325; 725/32; 725/40; 725/42; 725/51; 725/60; 725/86; 725/87; 369/47.13; 348/584; 348/589

(58) Field of Classification Search
USPC ............ 382/100, 181, 305, 284, 325; 725/32, 725/38, 40, 42, 51, 60, 86, 87; 348/584, 348/589; 369/47.13
See application file for complete search history.

(56) References Cited

U.S. PATENT DOCUMENTS

| 5,485,611 | A | * | 1/1996 | Astle ............................... 382/236 |
| 5,590,262 | A | | 12/1996 | Isadore-Barreca |
| 5,708,845 | A | | 1/1998 | Wistendahl |
| 6,426,778 | B1 | | 7/2002 | Valdez |
| 6,570,587 | B1 | | 5/2003 | Efrat |
| 7,158,676 | B1 | | 1/2007 | Rainsford |
| 7,197,758 | B1 | * | 3/2007 | Blackketter et al. ............ 725/37 |
| 7,779,149 | B2 | * | 8/2010 | Doi et al. ....................... 709/236 |
| 8,151,298 | B2 | * | 4/2012 | Begeja et al. .................... 725/38 |
| 2001/0044808 | A1 | * | 11/2001 | Milewski et al. ............. 345/764 |
| 2002/0042913 | A1 | * | 4/2002 | Ellis et al. ........................ 725/32 |
| 2002/0075332 | A1 | | 6/2002 | Geilfuss |
| 2002/0129373 | A1 | * | 9/2002 | Noda et al. ....................... 725/90 |
| 2003/0093790 | A1 | * | 5/2003 | Logan et al. .................... 725/38 |
| 2003/0225696 | A1 | * | 12/2003 | Niwa .............................. 705/50 |
| 2004/0019524 | A1 | * | 1/2004 | Marshall ......................... 705/14 |
| 2004/0193441 | A1 | | 9/2004 | Altieri |
| 2004/0268398 | A1 | * | 12/2004 | Fano et al. ....................... 725/88 |
| 2005/0132401 | A1 | * | 6/2005 | Boccon-Gibod et al. ....... 725/34 |
| 2005/0193005 | A1 | * | 9/2005 | Gates et al. ................ 707/104.1 |
| 2005/0220439 | A1 | | 10/2005 | Carton |
| 2006/0020523 | A1 | | 1/2006 | Song |
| 2006/0092775 | A1 | * | 5/2006 | Asai et al. ................... 369/30.32 |
| 2006/0120689 | A1 | | 6/2006 | Baxter |
| 2006/0122984 | A1 | * | 6/2006 | Byers et al. ....................... 707/3 |
| 2006/0143676 | A1 | * | 6/2006 | Ukai ............................. 348/500 |
| 2006/0230123 | A1 | | 10/2006 | Simmons |
| 2007/0003223 | A1 | * | 1/2007 | Armstrong et al. ............. 386/95 |
| 2007/0078774 | A1 | | 4/2007 | Brown |
| 2007/0089158 | A1 | | 4/2007 | Clark |
| 2008/0065990 | A1 | * | 3/2008 | Harrison et al. ................ 725/37 |
| 2008/0126191 | A1 | * | 5/2008 | Schiavi ........................... 705/14 |

* cited by examiner

*Primary Examiner* — Eric Rush

(74) *Attorney, Agent, or Firm* — Scott P. Zimmerman, PLLC

(57) ABSTRACT

Methods, systems, and products are disclosed for indexing a digital scene in digital media. The digital media is stored in memory and a uniform resource locator is assigned to a digital scene within the digital media. The uniform resource locator uniquely identifies a resource from which the digital scene may be retrieved, and the uniform resource locator also uniquely identifies the digital scene from other scenes in the digital media. When a query is received for the uniform resource locator, then the digital scene is retrieved from the memory.

14 Claims, 13 Drawing Sheets

METHODS, SYSTEMS, AND PRODUCTS FOR INDEXING SCENES IN DIGITAL MEDIA

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Exemplary embodiments generally relate to computers, to television, and to data processing and, more particularly, to data packets in television formats, to display of additional information, and to electronic shopping.

Product placement in movies, advertisements, and other media can be improved. When a movie, for example, features a product or service, often times people would like to see the featured product or service without seeing the movie. Excerpts showing the product in the context of a well known film could be particularly persuasive to potential users. Or, the movie might be offensive to some people or the price of admission is too great. Regardless, an advertiser would like to have the featured product or service available to as many people as possible, even to those people who have not seen the movie. If the featured product or service was available to anyone, advertisers would benefit from increased exposure.

SUMMARY

The exemplary embodiments provide methods, systems, and products for indexing frames and/or scenes in digital media. Exemplary embodiments assign a unique uniform resource locator to a frame or a scene within the digital media. The uniform resource locator uniquely identifies a resource from which the frame or scene may be retrieved. Once the scene is defined, its associated uniform resource locator may then be used to retrieve the scene. Individual users may query for a particular scene's corresponding uniform resource locator. When the query is received, then the corresponding digital scene is retrieved from the memory and sent, downloaded, or streamed to the requesting device. An individual scene may thus be retrieved, without the need for downloading the entire digital media (such as an entire digital movie). As later paragraphs will explain, the digital scenes may be used to promote objects without the expense of producing separate advertisements.

More exemplary embodiments include a system for indexing digital media. The system includes means for storing the digital scene in memory and assigning a uniform resource locator to the digital scene. The uniform resource locator uniquely identifies a resource from which the digital scene may be retrieved, and the uniform resource locator also uniquely identifies the digital scene from other scenes in the digital media. When a query is received for the uniform resource locator, then means are included for retrieving the digital scene from the memory.

Other exemplary embodiments describe a computer program product for indexing digital media. The digital scene is stored in memory and a uniform resource locator is assigned to the digital scene. The uniform resource locator uniquely identifies a resource from which the digital scene may be retrieved, and the uniform resource locator also uniquely identifies the digital scene from other scenes in the digital media. When a query is received for the uniform resource locator, then the digital scene is retrieved from the memory.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
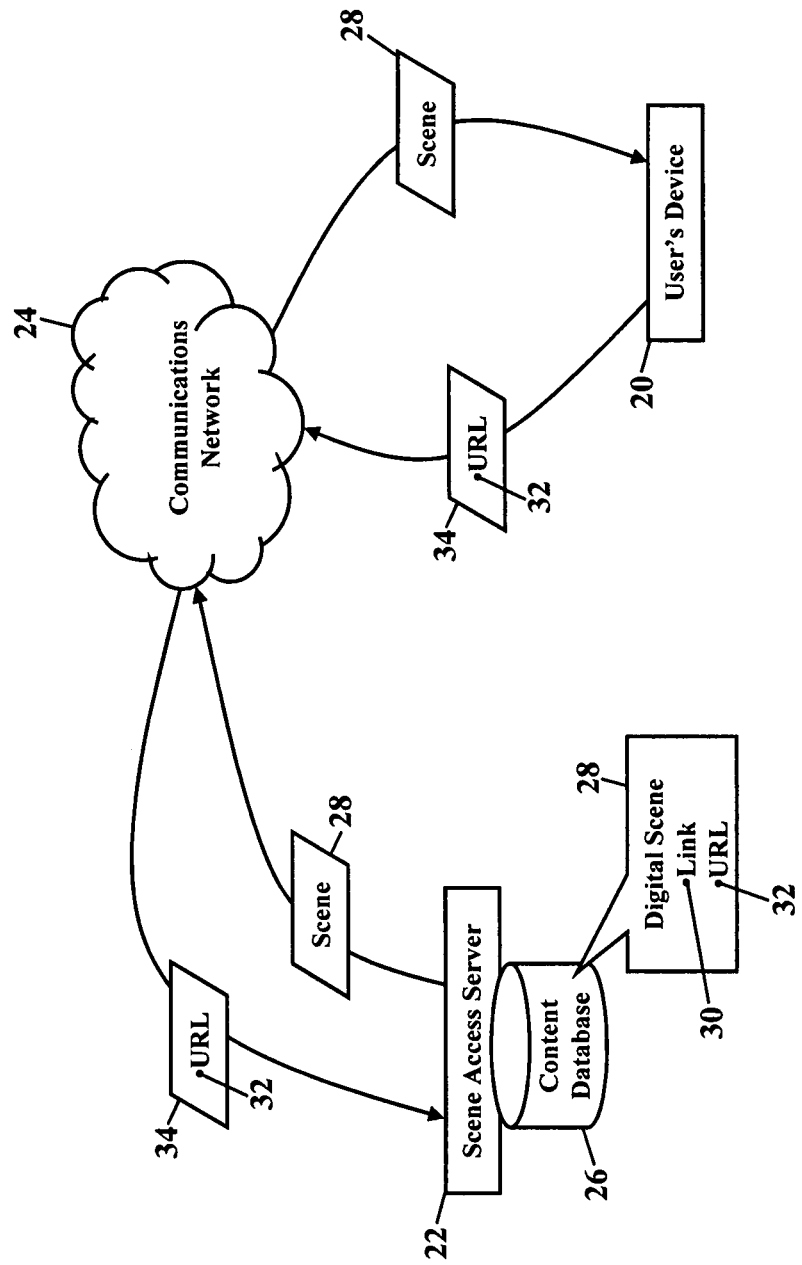
FIG. 1 is a simplified schematic illustrating the exemplary embodiments.

FIG. 1 is a simplified schematic illustrating the exemplary embodiments. FIG. 1 illustrates how a user may download individual scenes of digital media, such as movies, programs, and games. That is, the user may only retrieve an individual scene without the need for retrieving the entire movie, program, or game. A user's device 20 communicates with a scene access server 22 via a communications network 24. The scene access server 22 communicates with a content database 26. The content database 26 stores one or more individual scenes 28 of digital media which may be accessed by the user's device 20. Each scene 28 is accessed using an associated link 30, such as a uniform resource locator ("URL") 32. That is, each scene 28 may have a corresponding uniform resource locator 32. Each uniform resource locator 32 uniquely identifies the resource from which the associated scene 28 may be retrieved. When the user, at the user's device 20, wishes to access or retrieve a particular scene 28 from some digital media, the user's device 20 queries the scene access server 22 using the scene's corresponding uniform resource locator 32. The user's device 20 sends a query 34, and the query 34 includes information representing the scene's corresponding uniform resource locator 32. The scene access server 22 queries the content database 26 for the scene's corresponding uniform resource locator 32 and retrieves the desired scene 28. The scene access server 22 then communicates the scene 28 to the user's device 20 (such as by download, session, or streaming technique). The user, at the user's device 20, may then listen to, view, or otherwise enjoy the individual scene 28, without accessing the entire digital media file. Exemplary embodiments, then, describe how individual scenes (or even individual frames) of digital media may be accessed. Later paragraphs will also explain how billing may be arranged for retrieval of the desired scene 28.

Exemplary embodiments may be applied regardless of networking environment. The communications network 24 may be a cable network operating in the radio-frequency domain and/or the Internet Protocol (IP) domain. The communications network 24, however, may also include a distributed computing network, such as the Internet (sometimes alternatively known as the "World Wide Web"), an intranet, a local-area network (LAN), and/or a wide-area network (WAN). The communications network 24 may include coaxial cables, copper wires, fiber optic lines, and/or hybrid-coaxial lines. The communications network 24 may even include wireless portions utilizing any portion of the electromagnetic spectrum and any signaling standard (such as the I.E.E.E. 802 family of standards, GSM/CDMA/TDMA or any cellular standard, and/or the ISM band). The concepts described herein may be applied to any wireless/wireline communications network, regardless of physical componentry, physical configuration, or communications standard(s).

Figure 2:
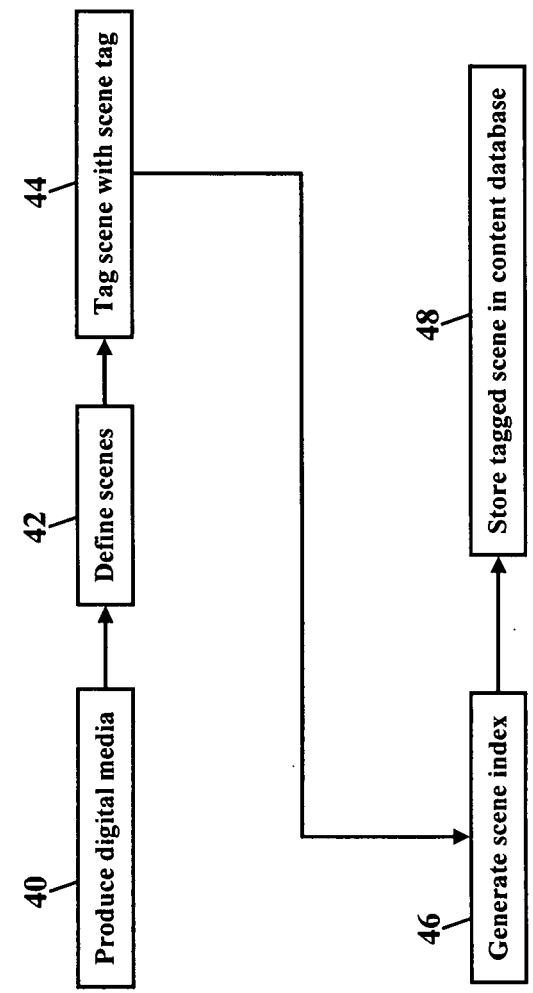
FIGS. 2 and 3 are schematics illustrating the tagging of scenes of digital media, according to exemplary embodiments.
Figure 3:
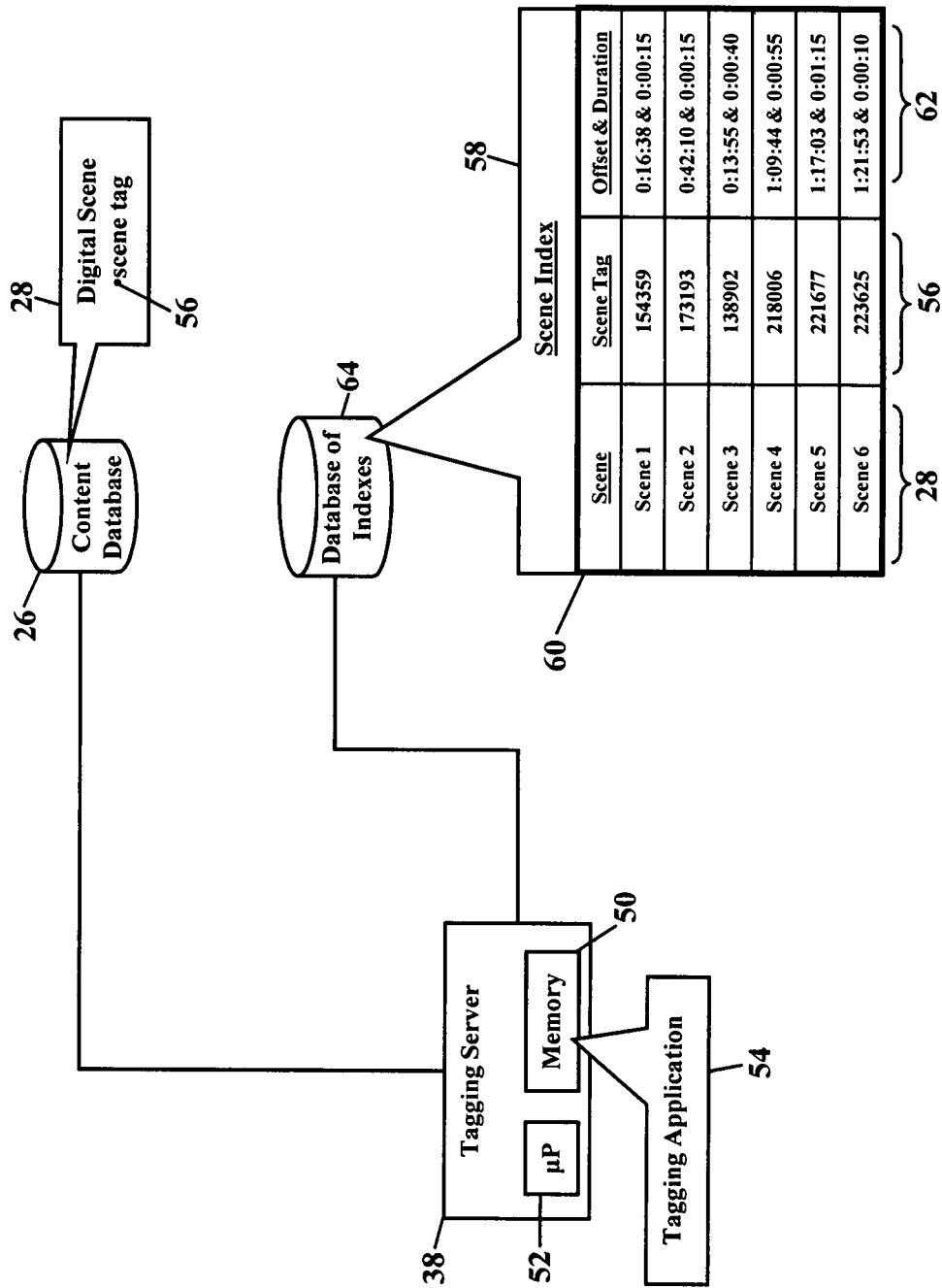

FIGS. 2 and 3 are schematics illustrating the tagging of scenes of digital media, according to exemplary embodiments. FIG. 2 is a flowchart illustrating a method of tagging scenes, while FIG. 3 illustrates a tagging server 38 that may perform the method of FIG. 2. Before the individual scene (illustrated as reference numeral 28 in FIG. 1) may be retrieved, the scene 28 may need to be defined or designated. FIG. 2, then, illustrates how an arbitrary audio/video scene 28 within any digital media (such as a movie, program, or game) is tagged. There are, however, many known schemes for tagging scenes, so FIG. 2 only presents a generalized method for tagging scenes of digital media. When the digital media is produced (Block 40), one or more scenes are defined (Block 42). The reader should realize that the term "scene" or "scenes" may encompass arbitrary designations of scenes. That is, the scene 28 need not correspond to a traditional "scene" in the theatrical or cinematographic sense. Individual scenes, instead, may be defined with any specific starting and ending points. Any individual frame, or sequence of frames, may be labeled as a scene using any starting and ending frame, time, or other designation. Scenes may be arbitrarily defined to prove context. Regardless, once the scenes are defined, each scene is then tagged or associated with a scene tag (Block 44). Once the scenes are tagged, a scene index may be generated (Block 46). The scene index may associate each scene to its corresponding scene tag. The tagged scene may then be (although not necessarily) separately stored in the content database 26 (Block 48).

Any means of defining and tagging a scene may be used. An individual scene, for example, may be defined by a timing measurement, such as an offset time and a duration. Suppose, for example, that a sequence of frames in a movie promotes a fashion designer's clothing. That is, the fashion designer has negotiated to have her/his clothing featured in a movie. The scene that promotes this clothing (e.g., the promoted object) may be defined to begin at 0:14:39 from a start of the digital media and lasts for a duration of 0:00:30. The scene, in other words, is thirty (30) seconds in duration. A scene may additionally or alternatively be defined by a starting frame number and by a range or number of successive, contiguous frames. Scenes may also be defined in a parallel track synchronized with the digital media, as is sometimes done for alternate languages or subtitles. Regardless, exemplary embodiments permit definition of arbitrary scenes for any purpose. Again, though, because tagging of scenes is known, no further explanation is needed.

The scene index is used to retrieve a desired scene. The scene index may be a logical relationship between scene tags and their corresponding offset time and a duration. That is, when a request is received for a scene tag, the content database 26 accesses the digital media (e.g., a movie) and "jumps" or advances to the corresponding offset time and a duration. The content database 26, then, may quickly retrieve and deliver the desired scene that corresponds to the scene tag. Scenes, then, may be defined and accessed from the digital media on a random access basis. Individual scenes, however, may additionally or alternatively be stored separately from the corresponding digital media. That is, the content database 26 may individually store each scene separate from the corresponding movie.

FIG. 3, then, illustrates the tagging server 38. The tagging server 38 may perform the method illustrated in FIG. 2. The tagging server 38 accesses and retrieves the scene 28 stored in the content database 26. The content database 26 is illustrated as being remotely accessible to the tagging server 38 (via the communications network 24 illustrated in FIG. 1), yet the content database 26 may be locally stored in memory 50 of the tagging server 38. The tagging server 38 has a processor 52 (e.g., "µP"), application specific integrated circuit (ASIC), or other similar device that executes a tagging application 54 stored in the memory 50. The tagging application 54 is a set of processor-executable instructions that tags and/or indexes the scenes 28. The content database 26 may then store the tagged and scene-indexed digital media.

The tagging application 54 tags the scenes 28. As the above paragraphs explained, any means of defining and of tagging the scene 28 may be used. However the scene 28 is defined and tagged, each digital scene 28 may be associated, or tagged, with a scene tag 56. The scene tag 56 may be any alphanumeric information or combination that uniquely identifies the digital scene 28. The scene tag 56 may differentiate one digital scene from other frames and/or from other scenes 28.

The tagging application 54 may then generate a scene index 58. The scene index 58 lists each digital scene 28 and its corresponding scene tag 56. FIG. 3, for example, illustrates the scene index 58 as a table 60 that maps, relates, or otherwise associates the digital scenes 28 to the scene tags 56. The scene index 58, for example, may also associate each digital scene 28 to its corresponding starting and ending point (such as the offset time and duration, illustrated as reference numeral 62). The tagging application 54 may then store the scene index 58 in a database 64 of indexes. The database 64 of indexes is illustrated as being remotely accessible to the tagging server 38 (via the communications network 24 illustrated in FIG. 1), yet the database 64 of indexes may be locally stored in the memory 50 of the tagging server 38. The scene index 58 may then be distributed to users, thus allowing users to retrieve desired scenes of digital media.

Figure 4:
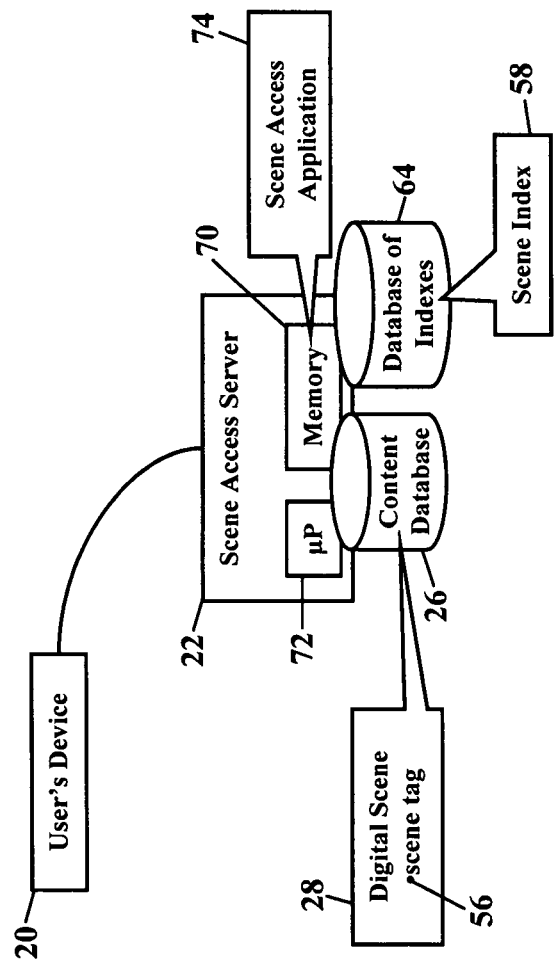
FIG. 4 is a detailed schematic illustrating a scene access server and a content database, according to more exemplary embodiments.

FIG. 4 is a detailed schematic illustrating the scene access server 22 and the content database 26, according to more exemplary embodiments. Once the scene 28 is tagged and indexed, the scene access server 22 retrieves and provides the scene 28 to users (such as the user's device 20). In simple terms, when the user's device 20 queries the scene access server 22 for the scene 28, the scene access server 22 may access and retrieve the scene 28 from the content database 26. The content database 26 is illustrated as being locally stored in memory 70 of the scene access server 22, yet the content database 26 may be remotely accessible via the communications network (illustrated as reference numeral 24 in FIG. 1). The scene access server 22 has a processor 72 (e.g., "µP"), application specific integrated circuit (ASIC), or other similar device that executes a scene access application 74 stored in the memory 70. The scene access application 74 may be a set of processor-executable instructions that accesses the scene 28, according to exemplary embodiments.

Figure 5:
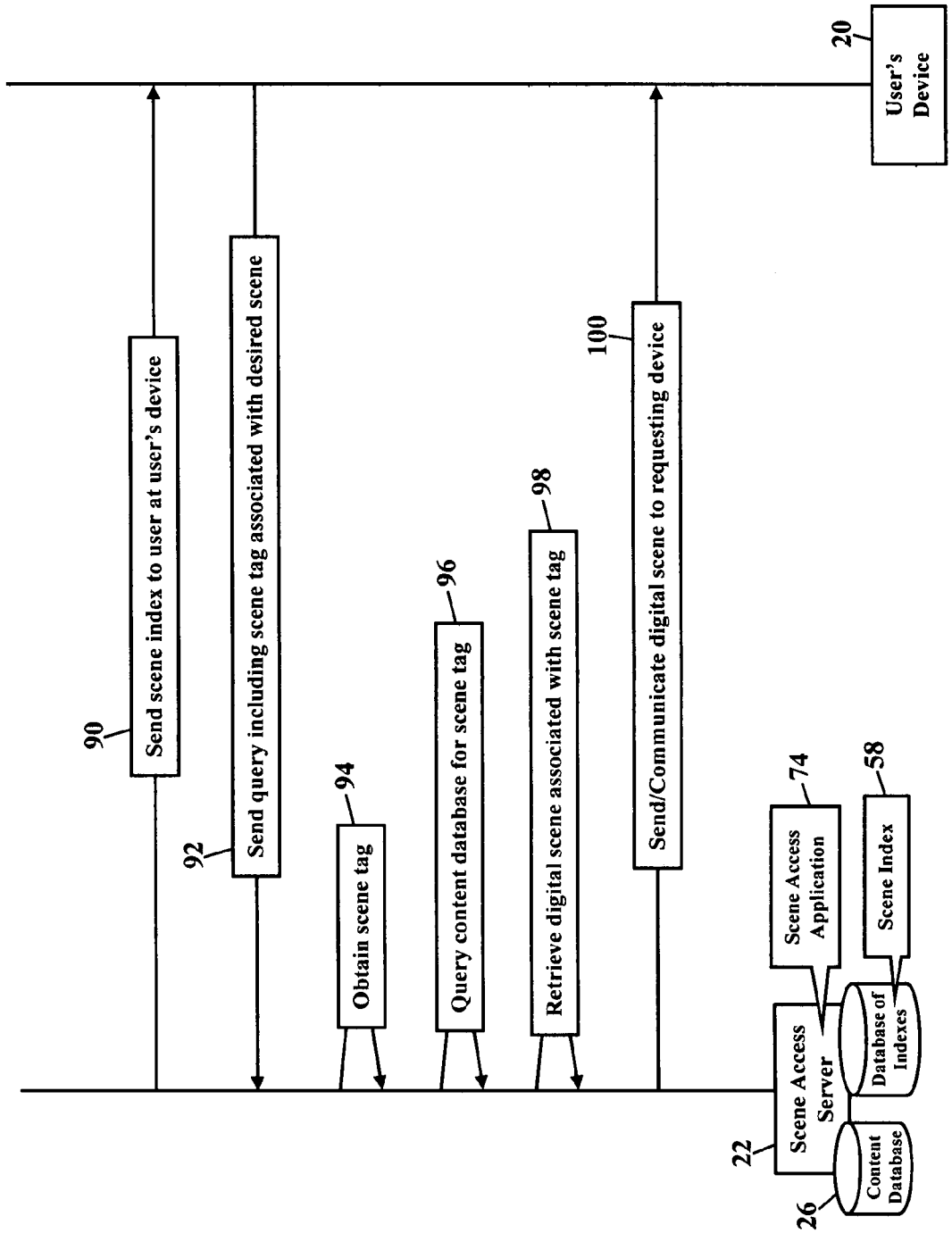
FIG. 5 is a schematic illustrating a process for retrieving scenes, according to more exemplary embodiments.

FIG. 5 is a schematic illustrating a process for retrieving scenes, according to more exemplary embodiments. Once the scene index 58 is generated, the scene access application 74 may send the scene index 58 to the user's device 20 (Block 90). The scene index 58 informs the user of what digital scenes 28 are retrievable from the scene access server 22 and/or the content database 26. Should the user wish to retrieve a particular scene 28, the user's device 20 may send a query to the scene access server 22 (Block 92). The query may include the scene tag 56 that corresponds to the desired scene 28. When the scene access server 22 receives the query, the scene access application 74 reads or otherwise obtains the scene tag 56 (Block 94). The scene access application 74 may then query the content database 26 for the scene tag 56 (Block 96). The corresponding digital scene 28 is retrieved from the content database 26 (Block 98), and the scene access application 74 arranges or initiates a download, file transfer, session, or other communication with the user's device 20 (Block 100). The scene access application 74 causes the desired digital scene 28 to be communicated to the user's device 20. When the user's device 20 receives the desired scene 28, the user's device 20 may then invoke a browser, MPEG decoder, or other application or hardware to view the scene 28. The user may thus enjoy the digital scene 28 without being forced to receive or accept the entire digital media file (e.g., an entire movie).

Figure 6:
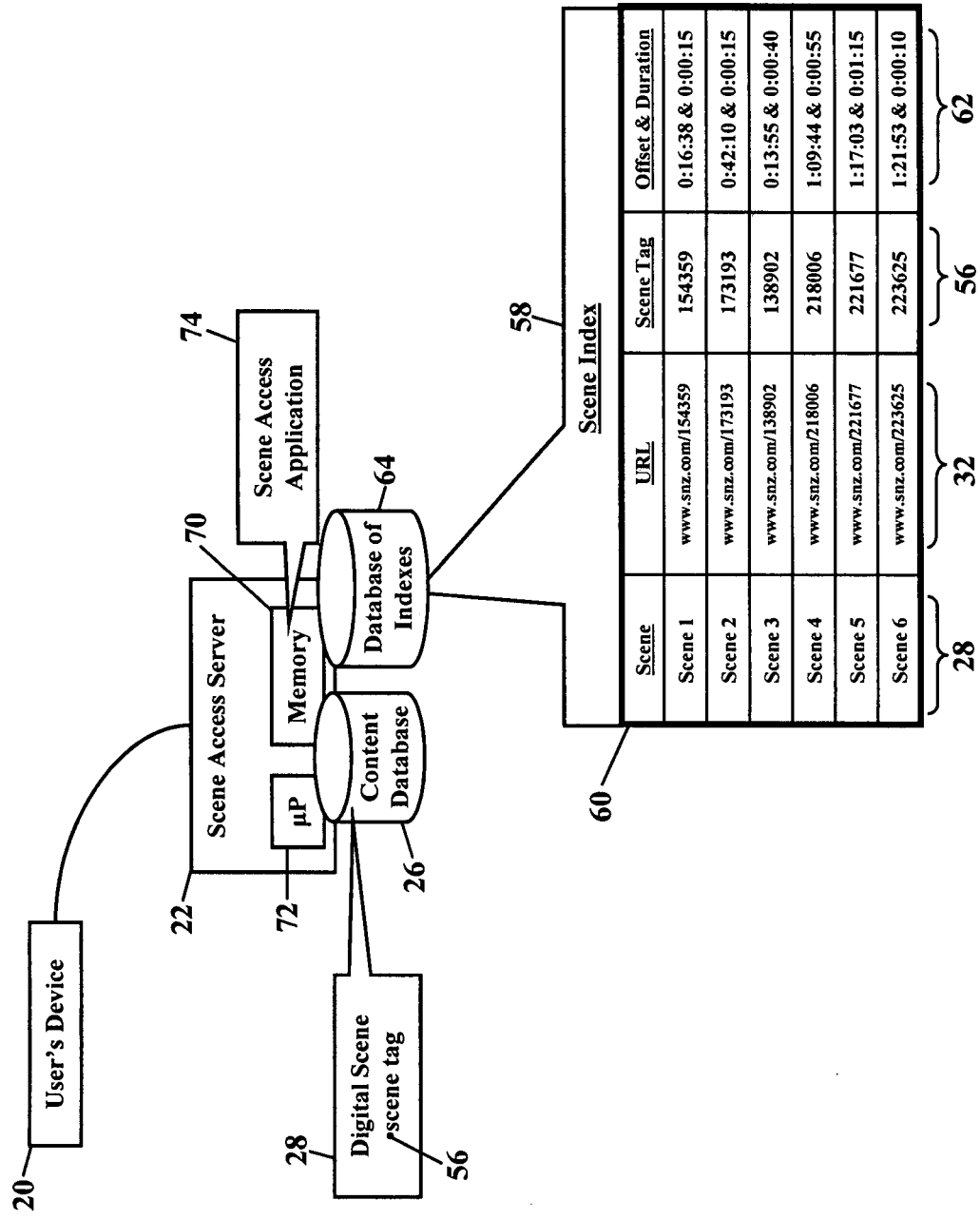
FIG. 6 is a schematic illustrating a scene index, according to more exemplary embodiments.

FIG. 6 is a schematic further illustrating the scene index 58, according to more exemplary embodiments. Here exemplary embodiments may enhance the scene index 58 to associate the unique uniform resource locator 32 to each scene 28. That is, exemplary embodiments may add, insert, or otherwise assign the uniform resource locator 32 to each digital scene 28. The scene access application 74, for example, may associate the uniform resource locator 32 to each scene 28 in the scene index 58. In other embodiments the tagging application (illustrated as reference numeral 54 in FIG. 3) may add or associate the uniform resource locator 32 to each scene 28 in the scene index 58. Regardless, the uniform resource locator 32 describes a server, server location, or other resource from which the associated scene 28 may be retrieved. Should the user's device 20 query for and receive the scene index 58 (as FIG. 5 explained), the user is thus informed of the individual scenes 28 that are available for download. Should the user query for a particular scene's uniform resource locator 32, the scene access application 74 may access, retrieve, and initiate a download of the corresponding scene 28.

Here, then, each scene 28 may have a corresponding uniform resource locator 32. Each uniform resource locator 32 uniquely identifies the resource from which the associated scene 28 may be retrieved. When the user wishes to access or retrieve a particular scene 28 from some digital media, the user's device 20 need only query for the scene's corresponding uniform resource locator 32. The scene access server 22 queries the content database 26 for the scene's corresponding uniform resource locator 32 and retrieves the desired scene 28. The scene access server 22 then communicates the scene 28 to the user's device 20. The user may then enjoy the individual scene 28, without accessing the entire digital media file.

Figure 7:
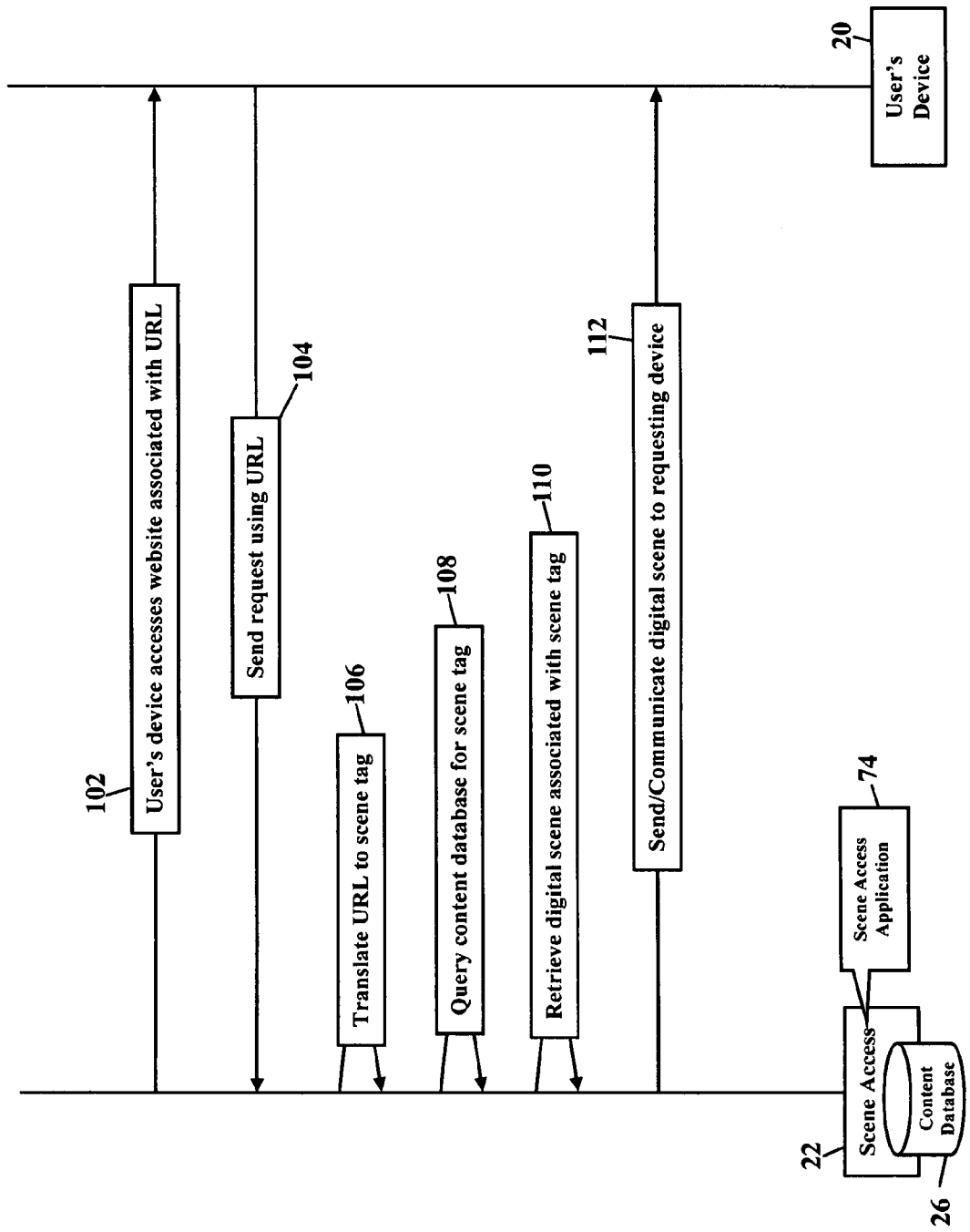
FIG. 7 is another schematic illustrating another process for retrieving scenes, according to more exemplary embodiments.

FIG. 7 is a schematic illustrating a detailed process for retrieving scenes, according to more exemplary embodiments. Here the uniform resource locator 32 may be translated into its corresponding scene tag 56. The user's device 20 accesses a website or webpage associated with a uniform resource locator 32 (Block 102). The uniform resource locator 32, for example, may be associated with a link on a website that promotes a product (e.g., an automobile). When the user wishes to retrieve a particular scene 28, the user's device 20 may send a request to the scene access server 22 using the uniform resource locator 32 (Block 104). An Internet service provider's domain name server, for example, may translate the uniform resource locator 32 to a network address associated with the scene access server 22 (such as a Scene Access Complex Internet Address). The scene access server 22 may translate the uniform resource locator 32 to a corresponding scene tag 56 (Block 106). The scene access server 22 may query the content database 26 for the scene tag 56 (Block 108). The scene access server 22 retrieves the digital scene 28 associated with the scene tag 56 (Block 110). The scene access server 22 sends the digital scene 28 to the requesting device (e.g., the user's device 20) (Block 112).

Exemplary embodiments may even include billing schemes. When the user's device 20 retrieves or receives the digital scene 28, some entity may be charged for the scene 28. The indexing application 36, for example, may include a billing component or module. The indexing application 36 may then charge or impose a fee for the scene 28. An advertiser, for example, may be charged a fee each time a user accesses a scene. The user, associated with the user's device 20, may additionally or alternatively be charged for the scene. The user's device 20, for example, may be associated with a billing profile, such that a credit card is charged or an account is debited. The indexing application 36 may even implement a subscription plan that regularly provides scenes for a fee.

Figure 8:
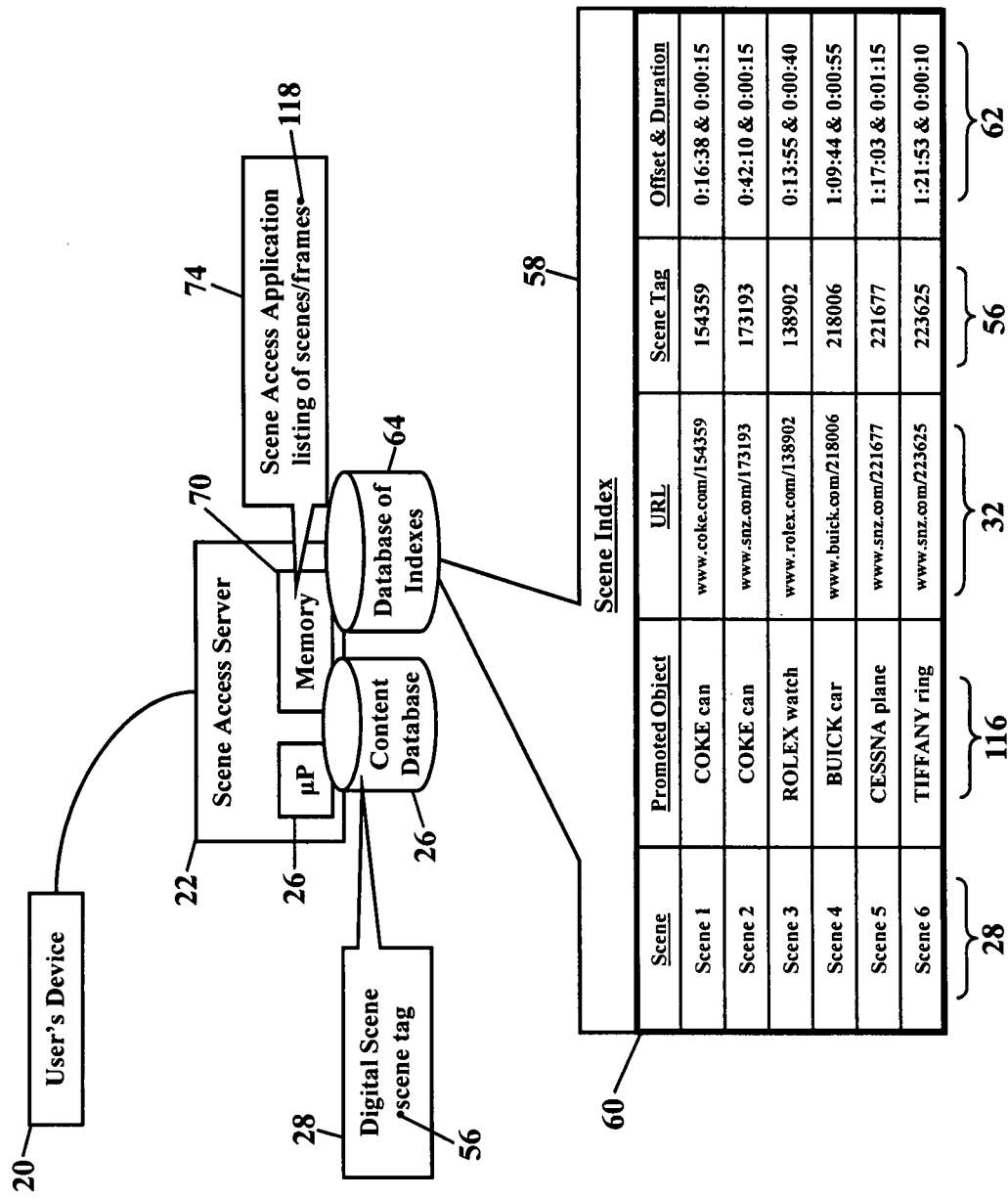
FIG. 8 is a schematic further illustrating the scene index, according to more exemplary embodiments.

FIG. 8 is a schematic further illustrating the scene index 58, according to more exemplary embodiments. As earlier paragraphs mentioned, exemplary embodiments may be applied to advertisements that promote objects. That is, exemplary embodiments may be used to index and access scenes that promote any product or service which is placed in a move, program, game, or other digital media. The digital media may be any movie, video, advertisement, website, or other content. The promoted object may be a person (such as a celebrity), a consumer good, an investment service, or any other object of interest. Suppose, for example, an automotive manufacturer places its new vehicle in a major motion picture. The manufacturer would like to advertise the picture's starring actor driving the manufacturer's new vehicle. The manufacturer could, conventionally, pay for a separate commercial that features the actor and the new vehicle. Exemplary embodiments, however, permit the manufacturer to define and access the particular scene 28 from the motion picture that features the actor and the new vehicle. The scene 28 may be available from (or stored in) the content database 26, and the manufacturer may include a link (e.g., the uniform resource locator 32) on its website. When the uniform resource locator 32 is selected, the scene access server 22 is queried for the corresponding digital scene 28. There is no need to separately produce a commercial. Similarly, the scene access server 22 may provide uniform resource locator links to scenes of a celebrity drinking a COKE® product, some person checking into a MARRIOTT® hotel, and/or an attractive person wearing the latest TOMMY HILFIGER® shirt. The digital scenes 28 available from and/or stored in the scene access server 22 may be accessed and quickly formatted for other online advertising, for television/cable broadcasts, and for Internet Protocol television service. Exemplary embodiments, then, generate a much less costly advertising alternative to separately filmed commercials.

FIG. 8, then, illustrates the scene index 58. Here the scene index 58 again lists each digital scene 28, its corresponding scene tag 56, and its corresponding uniform resource locator 32. Here, however, the scene index 58 may also map, relate, or otherwise associate each scene 28 to a promoted object 116. Each scene tag 56 may uniquely identify individual frames or scenes in which the promoted object 116 appears. The scene access application 74 may have logic or programming that recognizes the promoted object 116 within the frame or scene. The scene access application 74, additionally or alternatively, may retrieve a listing 118 of the scenes or frames in which each object 116 appears. Regardless, the scene access application 74 may access each scene 28 in which the object 116 appears or into which the object 116 is incorporated.

The scene access application 74 accesses the scene index 58. The scene index 58 may list each scene 28 in which the object 116 appears and/or each corresponding scene tag 56. FIG. 8, for example, illustrates the scene index 58 as the table 60 that maps, relates, or otherwise associates the scene tag 56 to the promoted object 116. While the scene index 58 may be associated with only a single promoted object, in FIG. 8 the scene index 58 is organized according to multiple promoted objects 116. Many movies, for example, contain several, if not many, product placements. The scene index 58, then, lists each promoted object 116 and each scene 28 in which that promoted object 116 appears. The scene index 58 may also list each scene's corresponding scene tag 56.

The database 64 of indexes may store one or multiple scene indexes. Each scene index 58 may correspond to a different promoted object 116. One scene index 58, for example, may map, relate, or otherwise associate COCA-COLA® products to movies, games, and other digital media. In other words, the scene index may associate COCA-COLA® products to multiple movies that promote those objects. Likewise, another scene index 58 may associate GENERAL MOTORS® to some or all movies and games that promote GM® vehicles. Similarly, the scene index 58 may only associate scenes and/or products in a single movie. The scene index 58, for example, may correspond to THE THOMAS CROWN AFFAIR® and only associate scenes and/or products in that movie. The scene index 58, however, may also correspond to a multiple media, such as the JAMES BOND® family of movies, a television series, or any grouping of media products. Regardless, the database 64 of indexes may store many scene indexes 68, with one or more of the scene indexes 68 associated with a particular digital media product and/or a promoted object.

Figure 9:
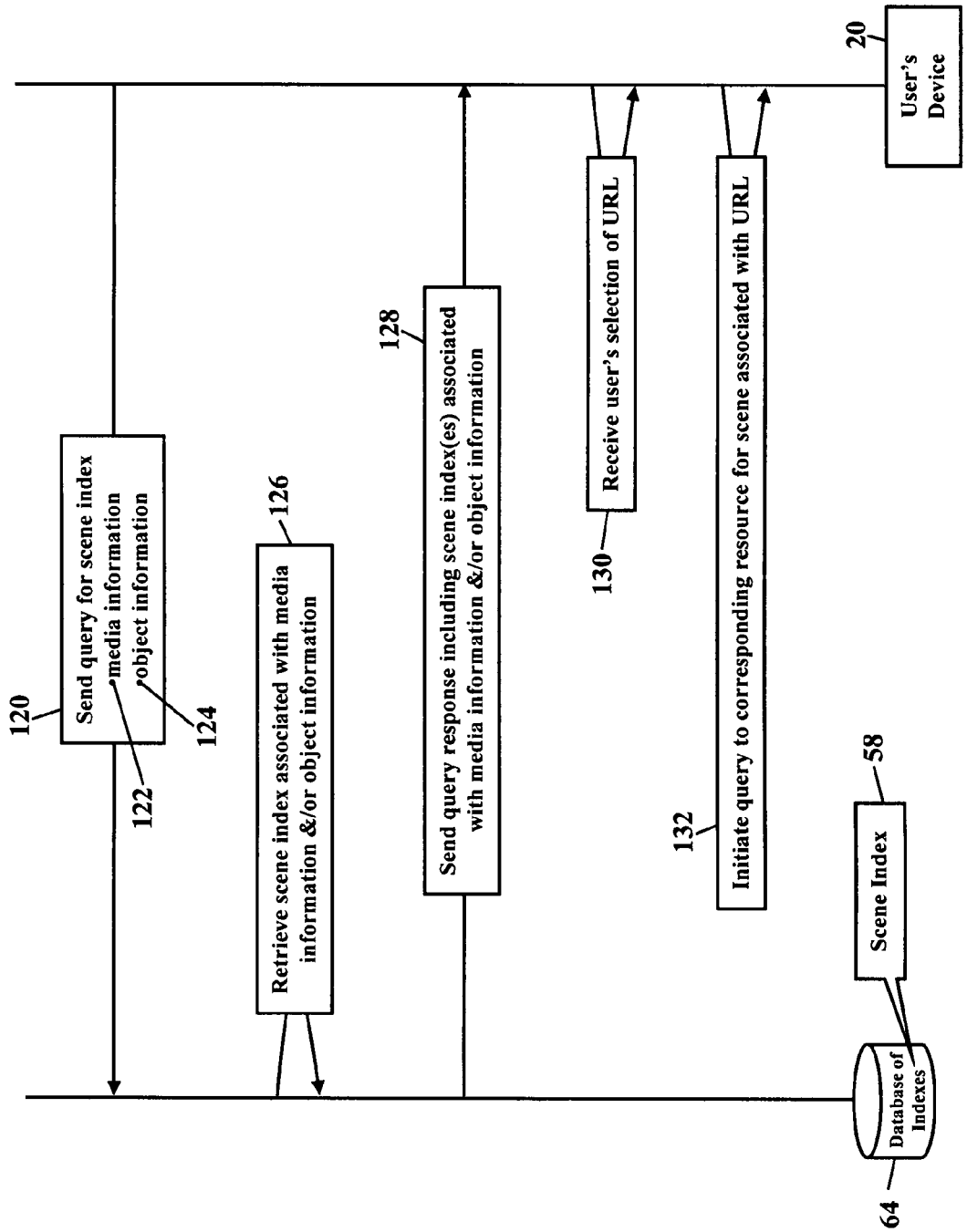
FIG. 9 is a schematic illustrating another process for retrieving scenes, according to more exemplary embodiments.

FIG. 9 is a schematic illustrating another process for retrieving scenes, according to more exemplary embodiments. Here the database 64 of indexes may be queried for the promoted objects 116. When the user wishes to retrieve an index of promoted objects for a particular digital media, the user's device 20 sends a query (Block 120). FIG. 9 illustrates the query arriving at the database 64 of indexes. That is, the query may be directly sent from the user's device 20 to the database 64 of indexes, or the query may be sent to the scene access server 22 and then forwarded to the database 64 of indexes. The query may include media information 122 that identifies the digital media. The media information 122, for example, may be a title of a movie, program episode, or game. The query may additionally or alternatively include object information 124 that identifies the promoted object. The object information 124 may a name or text associated with the promoted object 116. The object information 124, for example, may be a brand name, such as "Coke" or "General Motors." The object information 124, however, may be a generic descriptor, such as "soft drink" or "automobile." When the database 64 of indexes receives the query, the database 64 of indexes retrieves the scene index 58 associated with the media information 122 and/or the object information 124 (Block 126). The database 64 of indexes, for example, may retrieve the scene index 58 associated with the media information 122 (e.g., the title of a movie). The database 64 of indexes may retrieve one or more of the scene indexes 68 that are associated with the object information 124. Suppose, for example, that the object information 124 describes a ROLEX® watch. The database 64 of indexes may then retrieve a listing of all the scene indexes 68 that are associated with a ROLEX® watch. Regardless, the database 64 of indexes sends a query response (Block 128), and the query response includes the one or more scene indexes 58 associated with, or matching, the media information 122 and/or the object information 124. When the user's device 20 receives the query response, the user's device 20 may cause a visual and/or audible presentation of the scene indexes 68. The user is thus informed of products and/or services promoted in digital media.

Once the scene index 58 is obtained, individual scenes may be retrieved. Because the scene index 58 may associate the uniform resource locator 32 to each scene 28, each scene's corresponding uniform resource locator 32 may be used to obtain the desired scene 28. The interactive, uniform resource locator 32 may describe a resource (such as a server or server location) from which the associated scene 28 may be stored and/or downloaded. When the user's device 20 queries the database 64 of indexes for the media information 122 and/or the object information 124, the retrieved scene index 58 may also include the uniform resource locator 32 associated with each scene 28 in which the promoted object 116 appears. When the user's device 20 receives the scene index 58, the user is thus informed of products promoted in a particular digital media. Should the user select a uniform resource locator 32 (Block 130), the user's selection may initiate a query to the corresponding resource for the scene 28 associated with the uniform resource locator 32. The user's device 20 may thus initiate a download of the corresponding scene(s) 28. The user's selection may also initiate a download or query for interactive information regarding the promoted object 116.

Suppose, for example, the scene index 58 provides an index of objects promoted in THE THOMAS CROWN AFFAIR®. When one of the promoted objects is a ROLEX® watch, the scene index 58 may list each scene 28 in which the ROLEX® watch appears. The scene index 58 may (or may not) list each corresponding scene tag 56. The scene index 58 may (or may not) list a frame number, time, or starting point at which the ROLEX® watch appears (perhaps measured from the start or beginning of the digital media). The scene index 58 preferably also lists the uniform resource locator 32 for each scene 28 in which the promoted object 116 appears. When the user's device 20 receives the scene index 58, the user may select the desired link 30 to initiate a fetch or download of the corresponding scene(s) 28. The user's device 20 may thus receive the scene 28 in which the ROLEX® watch appears. Security measures may also be implemented to ensure the user is legitimately requesting the scene 28 (e.g., clicking on a link on the product manufacturer's website) and not merely attempting to obtain a sneak preview of a movie.

The user may also receive information regarding the promoted object 116. When the user selects the desired uniform resource locator 32, the user's device 20 may also query for, or receive, information regarding the promoted object 116. When the user's device 20 receives the scene 28 in which the ROLEX® watch appears, the user's device 20 may also query for and/or receive promotional information regarding the ROLEX® watch. The user's device 20, for example, may also query for and receive pricing and vendor information, such as where the ROLEX® watch may be purchased and for what price. Exemplary embodiments may cause a visual and/or audible presentation of information regarding the promoted object 116. Exemplary embodiments may cause or present interactive links (e.g., uniform resource locators) from which the information may be retrieved.

Many schemes for obtaining product information, pricing, and vendors are known and, thus, not further discussed. If the reader desires more details, the reader is invited to consult the following sources: U.S. Pat. No. 5,590,262 to Isadore-Barreca; U.S. Pat. No. 5,708,845 to Wistendahl, et al.; U.S. Pat. No. 6,426,778 to Valdez; U.S. Pat. No. 6,570,587 to Efrat, et al.; U.S. Pat. No. 7,158,676 to Rainsford; U.S. Patent Application Publication 2002/0075332 to Geilfuss, et al.; U.S. Patent Application Publication 2004/0019524 to Marshall; U.S. Patent Application Publication 2004/0193441 to Altieri; U.S. Patent Application Publication 20050220439 to Carton, et al.; U.S. Patent Application Publication 2006/0020523 to Song; U.S. Patent Application Publication 2006/0120689 to Baxter; U.S. Patent Application Publication 20060230123 to Simmons, et al.; U.S. Patent Application Publication 2007/0078774 to Brown; and U.S. Patent Application Publication 2007/0089158 to Clark.

Figure 10:
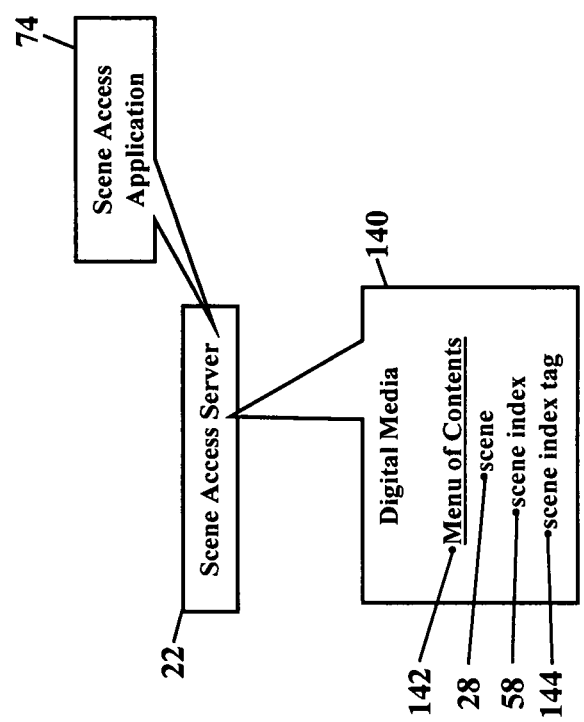
FIG. 10 is another schematic further illustrating the scene index 58, according to more exemplary embodiments.

FIG. 10 is another schematic further illustrating the scene index 58, according to more exemplary embodiments. Here the scene index 58 may be added to, or inserted into, its corresponding digital media 140. The scene index 58 corresponding to THE THOMAS CROWN AFFAIR®, for example, may be added to the digital movie. At any point or time during THE THOMAS CROWN AFFAIR®, the user may retrieve or view the scene index 58. FIG. 10, for example, illustrates a menu 142 of contents for the digital media 140. The menu 142 of contents is commonly available in most movies, games, and other digital media. The menu 142 of contents allows the user to scroll and select individual scenes or chapters within the digital media. FIG. 10, then, illustrates that exemplary embodiments may cause the scene index 58 to be inserted into, or associated with, the menu 142 of contents. The scene index 58 thus allows the user to "jump" or advance to a particular point or frame in which a desired object 116 is promoted. The user may thus view/listen to the scene 28 in which the promoted object 116 occurs. The user may also obtain product information, pricing information, and vendor information for the promoted product.

Exemplary embodiments may even add a scene index tag 144 to the scene index 58. The scene index tag 144 uniquely identifies a point within the digital media 140 at which the scene index 58 is placed or occurs. The indexing application 36, for example, may create, associate, or assign a new scene or chapter to the scene index 58. Exemplary embodiments may then tag the scene index 58 with the scene index tag 144. The scene index tag 144 may differentiate the scene index 58 from other scenes or other chapters within the digital media 140. When the digital media 140 is searched by scene or by chapter, the scene index 58 may then be easily accessed. At any point or time during THE THOMAS CROWN AFFAIR®, for example, the user may retrieve or view the scene index 58 and skip to a particular scene or frame in which a desired object is promoted. The user may also obtain product information, pricing information, and vendor information for the promoted object.

Other schemes may be used to add the scene index 58 to the digital media 140. The scene index 58, for example, may be added to one or more blank frames within the digital media 140. Exemplary embodiments may create, insert, or process at least one blank frame into the beginning, middle, end, or any other location in the digital media 140. Exemplary embodiments may then insert or copy the scene index 58 into the at least one blank frame. Exemplary embodiments, for example, may create the blank frame in or near a beginning of THE THOMAS CROWN AFFAIR®. Exemplary embodiments may then place, add, or insert the corresponding scene index 58 into the blank frame. Exemplary embodiments thus augment the digital media 140 with its corresponding scene index 58.

Figure 11:
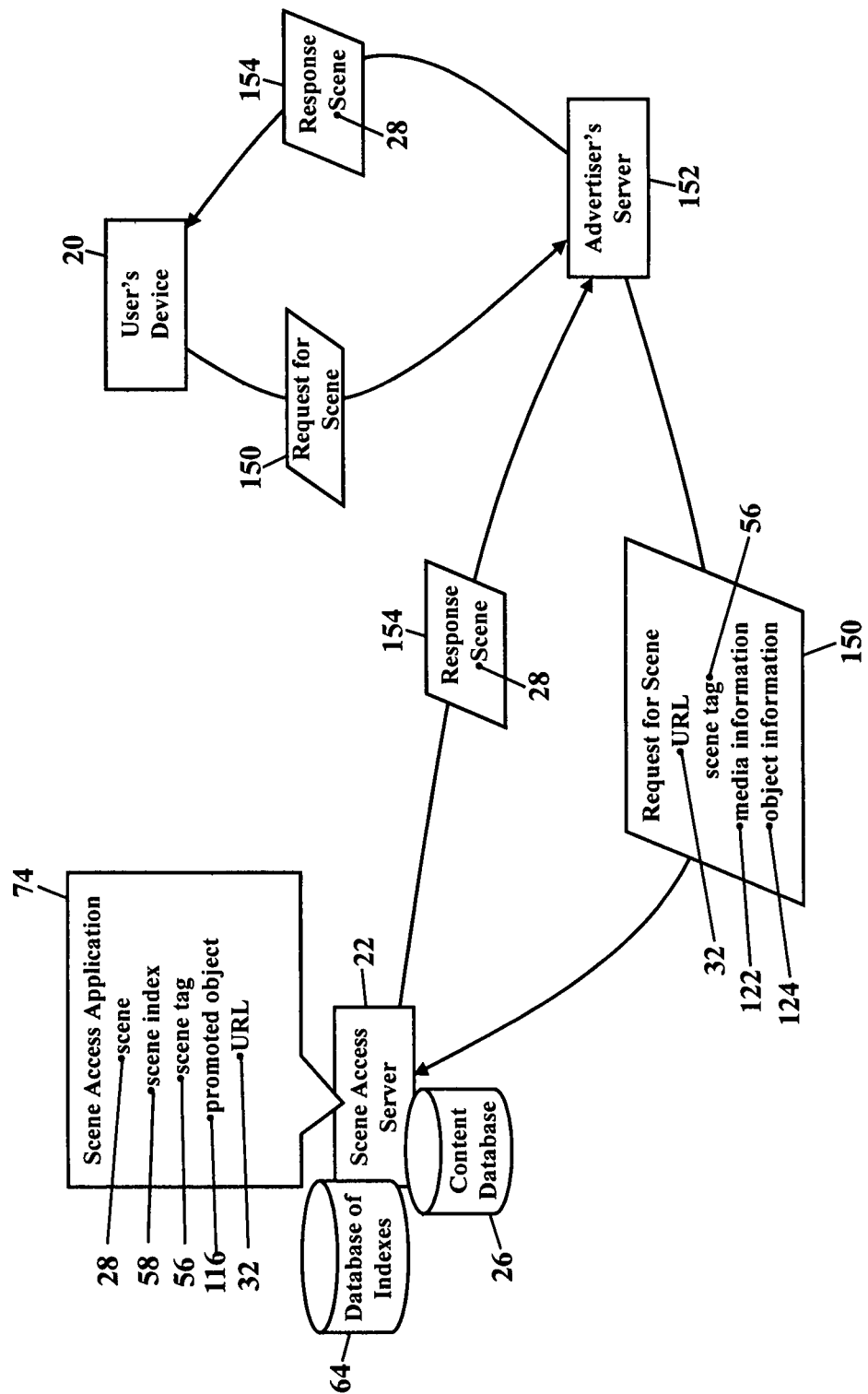
FIG. 11 is a schematic illustrating another environment in which exemplary embodiments may be implemented.

FIG. 11 is a schematic illustrating another environment in which exemplary embodiments may be implemented. Here the scene access server 22 may act as a content server and respond to requests for digital scenes 28. The scene access server 22 may be queried for scenes 28 or for frames containing the promoted object 116. As FIG. 11 illustrates, the scene access server 22 receives a request 150 (via the communications network 24 illustrated in FIG. 1). The request 150 may originate from any party or device, such as the user's device 20 or an advertiser's server 152. When an advertiser wishes to retrieve scenes that feature the promoted object 116, the request 150 may include the uniform resource locator 32 associated with the digital scene 28 in which the promoted object 116 appears. The request 150 may additionally or alternatively include the scene tag 56, the media information 122, and/or the object information 124.

Here, then, the scene access server 22 acts as a central content server that accesses and/or stores individual scenes 28 (or "clips") of digital media. That is, the scene access server 22 may store or access scenes for multiple, if not many, digital media files. When an advertiser desires to retrieve an individual scene 28 that promotes the object 116, the advertiser's server 152 queries the scene access server 22. The scene access application 74 then queries the content database 26 and/or the database 64 of indexes for the scene 28 that corresponds to the uniform resource locator 32, scene tag 56, the media information 122, and/or the object information 124. The scene access application 74 retrieves the desired scene 28 and sends a response 154. The response may include the advertiser's desired scene 28. When the advertiser's server 152 receives the response 154, the digital scene 28 may be used in any advertising media to promote the object 116. The scene 28, additionally or alternatively, may be directly sent to the user's device 20 or forwarded from the advertiser's server 152 to the user's device 20.

Exemplary embodiments may also charge for the scene 28. As the above paragraphs explained, exemplary embodiments may include a billing component or module. Exemplary embodiments may then charge or impose a fee each time the scene 28 is retrieved. Here, though, exemplary embodiments may charge an advertiser associated with the scene 28. That is, each time the scene 28 is retrieved, the advertiser is charged. The scene access application 74, for example, may include a logical counter that counts or tallies the number of queries (or "hits") received for the scene 28 and/or the uniform resource locator 32. The advertiser may then be charged, based on the number of queries or "hits." Security measures may also be implemented to ensure only legitimate advertisers have access to the scene 28, thus thwarting attempts to sneak a preview of a movie.

Figure 12:
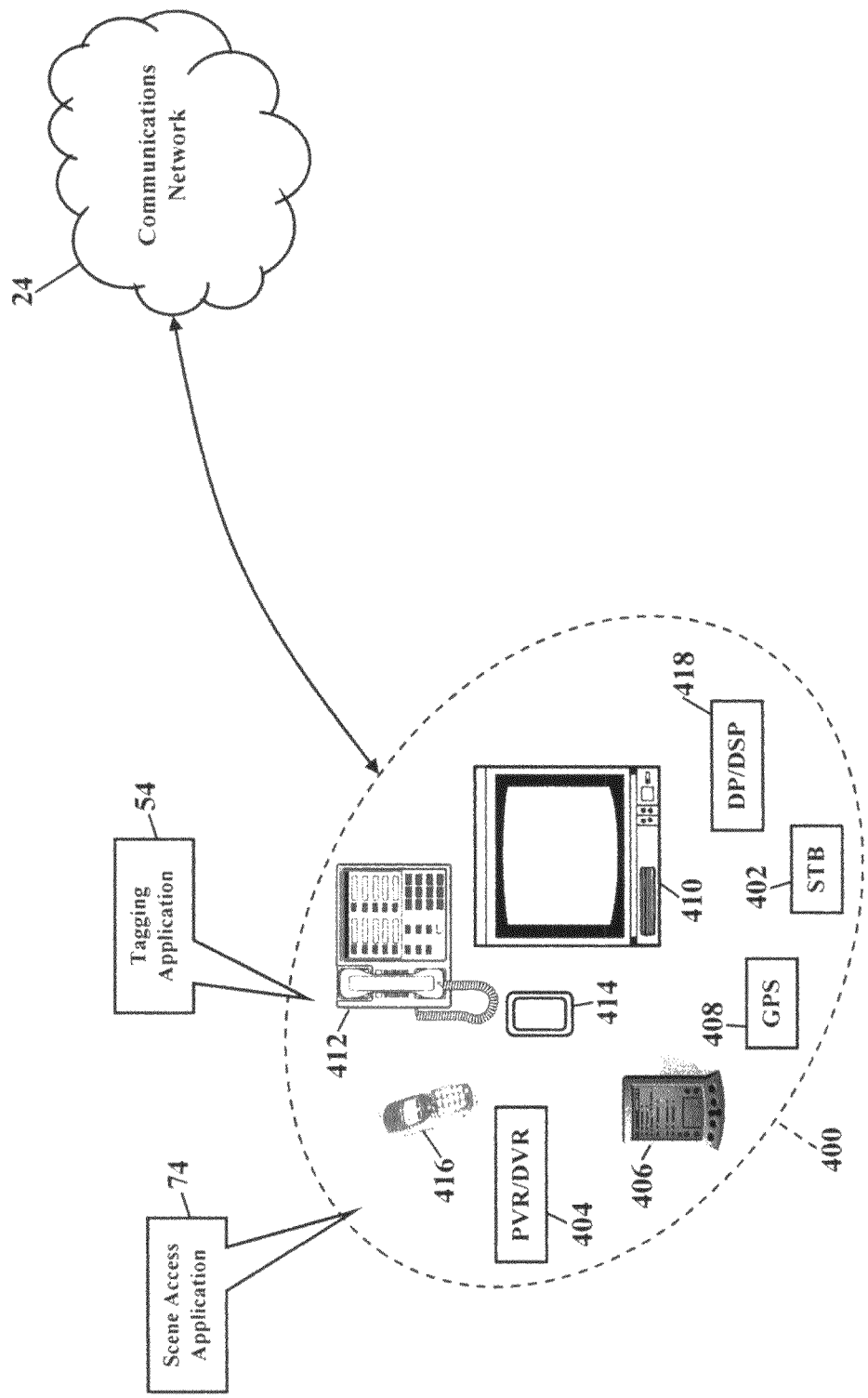
FIG. 12 depicts other possible operating environments for additional aspects of the exemplary embodiments.

FIG. 12 depicts other possible operating environments for additional aspects of the exemplary embodiments. FIG. 12 illustrates that the tagging application 54 and/or the scene access application 74 may alternatively or additionally operate within various other devices 400. FIG. 12, for example, illustrates that the tagging application 54 and/or the scene access application 74 may entirely or partially operate within a set-top box (402), a personal/digital video recorder (PVR/DVR) 404, personal digital assistant (PDA) 406, a Global Positioning System (GPS) device 408, an interactive television 410, an Internet Protocol (IP) phone 412, a video-enabled phone 414 (such as an APPLE® iPhone™), a cellular/satellite phone 416, or any computer system and/or communications device utilizing a digital processor and/or a digital signal processor (DP/DSP) 418. The device 400 may also include watches, radios, vehicle electronics, clocks, printers, gateways, and other apparatuses and systems. Because the architecture and operating principles of the various devices 400 are well known, the hardware and software componentry of the various devices 400 are not further shown and described. If, however, the reader desires more details, the reader is invited to consult the following sources: ANDREW TANENBAUM, COMPUTER NETWORKS ($4^{th}$ edition 2003); WILLIAM STALLINGS, COMPUTER ORGANIZATION AND ARCHITECTURE: DESIGNING FOR PERFORMANCE ($7^{th}$ Ed., 2005); and DAVID A. PATTERSON & JOHN L. HENNESSY, COMPUTER ORGANIZATION AND DESIGN: THE HARDWARE/SOFTWARE INTERFACE ($3^{rd}$. Edition 2004); LAWRENCE HARTE et al., GSM SUPERPHONES (1999); SIEGMUND REDL et al., GSM AND PERSONAL COMMUNICATIONS HANDBOOK (1998); and JOACHIM TISAL, GSM CELLULAR RADIO TELEPHONY (1997); the GSM Standard 2.17, formally known *Subscriber Identity Modules, Functional Characteristics* (GSM 02.17 V3.2.0 (1995-01))"; the GSM Standard 11.11, formally known as *Specification of the Subscriber Identity Module—Mobile Equipment* (*Subscriber Identity Module—ME*) *interface* (GSM 11.11 V5.3.0 (1996-07))"; MICHEAL ROBIN & MICHEL POULIN, DIGITAL TELEVISION FUNDAMENTALS (2000); JERRY WHITAKER AND BLAIR BENSON, VIDEO AND TELEVISION ENGINEERING (2003); JERRY WHITAKER, DTV HANDBOOK (2001); JERRY WHITAKER, DTV: THE REVOLUTION IN ELECTRONIC IMAGING (1998); and EDWARD M. SCHWALB, iTV HANDBOOK: TECHNOLOGIES AND STANDARDS (2004).

Figure 13:
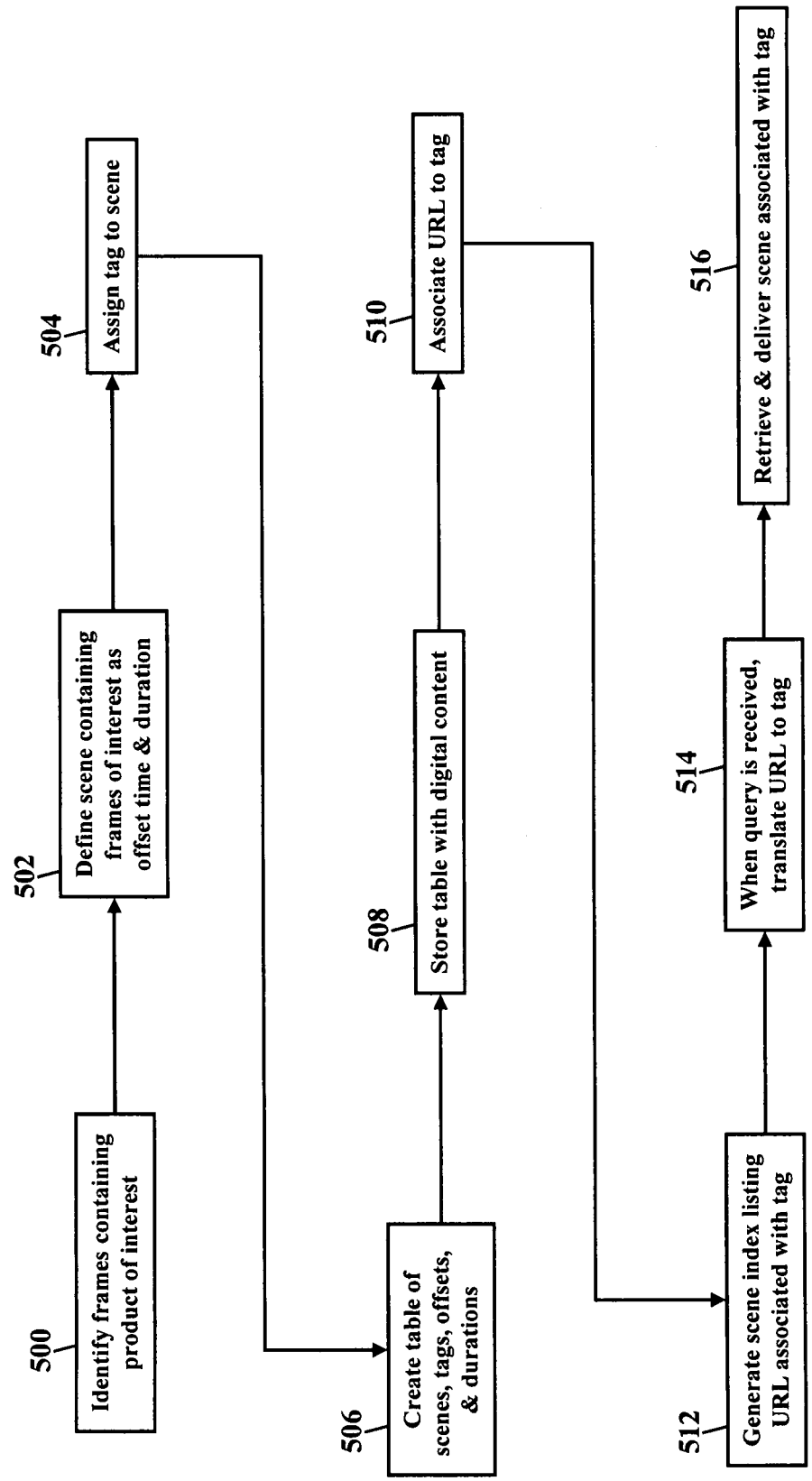
FIG. 13 is a flowchart illustrating a method of indexing a scene in digital media, according to still more exemplary embodiments.

FIG. 13 is a flowchart illustrating a method of indexing a scene in digital media, according to still more exemplary embodiments. Frames containing an object of interest (e.g., containing a product, service, person, place, or thing) are identified (Block 500). A digital scene may be defined as an offset time and a duration for the frames (Block 502). A tag is assigned to the scene (Block 504). A table scenes, tags, offsets, and durations is created (Block 506). The table is stored with (or separate from) the digital content (Block 508). A uniform resource locator is assigned to the tag (Block 510). A scene index may be generated that lists the uniform resource locator associated with the scene tag (Block 512). When a query is received for the uniform resource locator, the uniform resource locator is translated to the corresponding scene tag (Block 514). The scene, associated with the tag, is retrieved and delivered (Block 516).

Exemplary embodiments may be physically embodied on or in a transitory or non-transitory computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-subscribers, licensees, and assignees. A computer program product comprises processor-executable instructions for tagging, indexing, and/or accessing scenes in digital media.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method of promoting objects in digital media, comprising:
   receiving a query sent from a client device to a server, the query comprising of the digital media;
   querying a database of indexes for the title of the digital media, the database of indexes storing associations between different titles of digital media and different scene indexes;
   retrieving one of the different scene indexes that is associated with the title of the digital media, the one of the different scene indexes comprising a table that associates different promotional objects appearing in the digital media to their corresponding scenes within the digital media;
   retrieving the digital media associated with the title;
   inserting blank frames into the digital media;
   copying the one of the scene indexes retrieved from the database of indexes into the blank frames inserted into the digital media;
   assigning a new scene to the one of the scene indexes retrieved from the database of indexes copied to the blank frames inserted into the digital media;
   uniquely identifying the new scene with a scene index tag that differentiates the one of the scene indexes from other scenes in the digital media;
   adding the one of the scene indexes to a menu of contents associated with the digital media; and
   sending the digital media having the one of the scene indexes added therein from the server to the client device in response to the query.

2. The method according to claim 1, further comprising selectin a location within the digital media in which the blank frames are inserted.

3. The method according to claim 1, further comprising adding the scene index tag to the menu of contents.

4. The method according to claim 1, further comprising associating the different promotional objects appearing in the digital media to uniform resource locators from which each corresponding scene is retrieved.

5. The method according to claim 1, further comprising receiving another query from the client device, the another query specifying one of the different promotional objects listed in the one of the scene indexes copied to the blank frames added to the digital media.

6. The method according to claim 1, further comprising receiving another query from the client device, the another query specifying one of the corresponding scenes listed in the one of the scene indexes copied to the blank frames added to the digital media.

7. The method according to claim 1, further comprising defining each of the corresponding scenes with an offset time and a duration that promotes one of the different promotional objects.

8. A system for promoting objects in digital media, comprising:
   a processor; and
   memory storing instructions that when executed cause the processor to perform operations, the operations comprising:
   receiving a query sent from a client device, the query comprising a title of the digital media;
   querying a database of indexes for the title of the digital media, the database of indexes storing associations between different titles of digital media and different scene indexes;
   retrieving one of the different scene indexes that is associated with the title of the digital media, the one of the different scene indexes comprising a table that associates different promotional objects appearing in the digital media to their corresponding within the digital media;
   retrieving the digital media associated with the title;
   inserting blank frames into the digital media;
   copying the one of the scene indexes retrieved from the database of indexes into the blank frames inserted into the digital media;
   assigning a new scene to the one of the scene indexes retrieved from the database of indexes copied to the blank frames inserted into the digital media;
   uniquely identifying the new scene with a scene index tag that differentiates the one of the scene indexes from other scenes in the digital media;
   adding the one of the scene indexes to a menu of contents associated with the digital media; and
   sending the digital media having the one of the scene indexes added therein to the client device in response to the query.

9. The system according to claim 8, wherein the operations further comprise selecting a location within the digital media in which the blank frames are inserted.

10. The system according to claim 8, wherein the operations further comprise adding the scene index tag to the menu of contents.

11. The system according to claim 8, wherein the operations further comprise associating the different promotional objects appearing in the digital media to uniform resource locators from which each corresponding scene is retrieved.

12. The system according to claim 8, wherein the operations further comprise receiving another query from the client device, the another query specifying one of the different promotional objects listed in the one of the scene indexes copied to the blank frames added to the digital media.

13. The system according to claim 8, wherein the operations further comprise receiving another query from the client device, the another query specifying one of the corresponding scenes listed in the one of the scene indexes copied to the blank frames added to the digital media.

14. A non-transitory computer readable memory storing instructions that when executed cause a processor to perform operations, the operations comprising:
   receiving a query sent from a client device to a server, the query comprising of media;
   querying a database of indexes for the title of the media, the database of indexes storing associations between different titles of media and different scene indexes;
   retrieving one of the different scene indexes that is associated with the title of the media, the one of the different scene indexes comprising a table that associates different promotional objects appearing in the media to their corresponding scenes within the media;
   retrieving the media associated with the title;
   inserting blank frames into the media;
   copying the one of the scene indexes retrieved from the database of indexes into the blank frames inserted into the media;
   assigning a new scene to the one of the scene indexes retrieved from the database of indexes copied to the blank frames inserted into the media;

uniquely identifying the new scene with a scene index to that differentiates the one of the scene indexes from other scenes in the media;

adding the scene index tag to a menu of contents associated with the media; and sending the media having the one of the scene indexes added therein from the server to the client device in response to the query.

\* \* \* \* \*